United States Patent [19]
Cottone et al.

[11] Patent Number: 5,277,358
[45] Date of Patent: Jan. 11, 1994

[54] FINNED ASSEMBLY FOR HEAT EXCHANGERS

[75] Inventors: Andrew J. Cottone, Racine, Wis.; Zalman P. Saperstein, Lake Bluff, Ill.

[73] Assignee: Modine Manufacturing Co., Racine, Wis.

[21] Appl. No.: 38,926

[22] Filed: Mar. 29, 1993

Related U.S. Application Data

[60] Division of Ser. No. 855,248, Mar. 23, 1992, said Ser. No. 697,204, is a division of Ser. No. 558,613, Jul. 26, 1990, Pat. No. 5,042,574, which is a continuation-in-part of Ser. No. 406,064, Sep. 12, 1989, Pat. No. 4,949,543.

[51] Int. Cl.⁵ .................. B23K 1/19; B23K 103/10
[52] U.S. Cl. .................. 228/219; 148/531; 228/262.43; 228/262.5
[58] Field of Search .......... 228/183, 219, 208, 254, 228/263.16; 427/320; 148/519, 531

[56] References Cited

U.S. PATENT DOCUMENTS 3,701,196 10/1972 Kiesow et al. .................. 228/219
4,655,852 4/1987 Rallis .................. 148/531

*Primary Examiner*—Samuel M. Heinrich
*Attorney, Agent, or Firm*—Wood, Phillips, VanSanten, Hoffman & Ertel

[57] ABSTRACT

Potential difficulties with corrosion in heat exchangers utilizing aluminum fins are avoided by using fin and tube constructions made by a method which includes the steps of providing a flattened tube (50) of ferrous material (80) and having an exterior coating (82) predominantly of aluminum; providing at least one serpentine fin (56) of aluminum (86) and clad with a predominantly aluminum braze cladding (88); assembling (102) the fin (56) to the flattened tube (50); applying (94), (100), (104), a brazing flux to at least one of the fin (56) and the tube (50); raising (106) the temperature of the assembly to a level sufficient to at least partially melt the braze cladding (88); and maintaining the temperature for a sufficient period of time to achieve a brazed joint (60) between the fin (56) and the tube (50) but a time insufficient to convert the coating (82) and the cladding (88) to ferrous-aluminum intermetallic compound or intermediate phase.

6 Claims, 6 Drawing Sheets

FINNED ASSEMBLY FOR HEAT EXCHANGERS

CROSS REFERENCE

This is a divisional of copending application Ser. No. 855,248 filed Mar. 23, 1992, which is a continuation of application Ser. No. 697,204 filed May 8, 1991, now U.S. Pat. No. 5,102,032, which is a divisional of application Ser. No. 558,613 filed Jul. 26, 1990, now U.S. Pat. No. 5,042,574, which is a continuation-in-part of application Ser. No. 406,064 filed Sep. 12, 1989, now U.S. Pat. No. 4,949,543.

FIELD OF THE INVENTION

This invention relates to heat exchangers, and more particularly, to fin assemblies and methods of making the same for use in applications requiring corrosion resistance as, for example, condensing steam utilized to drive turbines in electrical generating plants, charge air coolers (automotive intercoolers), oil coolers and the like.

BACKGROUND OF THE INVENTION

Air cooled condensers have been in use in large power plants for over thirty years. Utilities worldwide now accept air-cooled condensers as an alternative to other types of cooling even if cooling water is available because the cost of cooling water has increasingly become one of the major criteria for the selection of a power plant site. By way of example, the use of an air-cooled condenser system enabled the 330 megawatt Wyodak power station erected near Gillette, Wyo., U.S.A. in 1978 to be located in an arid, coal-rich area. The power station was sited essentially on top of a seam of low sulphur coal without concern for a large plant water supply. The plant consumes only about 200 gallons per minute, mainly for boiler feed water make up.

Such a system thus easily meets or exceeds environmental regulation in terms of conservation of water while avoiding inadmissible or undesirable increases in temperature of rivers or lakes. In addition, the generation of plumes and the distribution thereof from water operated cooling towers is likewise avoided.

State-of-the-art air-cooled condensers frequently involve the so-called "A-tube" construction wherein elongated tubes of elliptical or circular cross section are arranged in an A-type configuration. Plate fins are disposed on the tube and both the tubes and the fins are typically made of steel or the like. Occasionally helically wound aluminum fins are employed as are aluminum plate fins.

The elliptical cross section provides a measure of protection against freezing of condensate within the tubes during wintery conditions, while the steel construction provides the necessary strength to allow tube lengths of 16 feet or more.

However, in order to obtain good heat transfer efficiency, it has been necessary that each branch of the A include at least two, and frequently as many as four, rows of tubes, the tubes in alternate rows generally being staggered. Needless to say, the greater the number of tube rows, the greater the air side pressure loss during operation and the greater the energy requirements for fans necessary to drive air through the air-cooled condenser. Further, multi-row constructions suffer difficulties in achieving uniform steam distribution between the rows, resulting in reduced thermal efficiency.

Another important consideration in air-cooled condensers is long life. It is necessary that the condensers have a life expectancy greater than 30, and more usually 40 years or more. Because such condensers are exposed to the ambient, it is necessary that they be highly corrosion resistant. One manufacturer promotes steel tubes with steel fins which are hot dip galvanized to avoid corrosion. This, of course, can be an extremely expensive process considering that the tanks that contain the galvanizing bath must be longer than the length of the tubes which, as noted above, frequently equal 16 feet or more. According to this manufacturer, tube and fin assemblies including a core tube helically wound with a fin or soft pure aluminum or extruded aluminum and steel assemblies, or any other type of aluminum fin are to be avoided unless they are provided with a plastic coating for corrosion resistance. This, however, eliminates action of the aluminum in producing a cathodic protective effect for the remainder of the assembly, an effect that is highly desirable when a heat exchanger may be used in any of a variety of applications where corrosion may be encountered.

Thus, notwithstanding the potential for substantial reductions both in the cost of materials used in fabricating the tube and fin assemblies, as well as erection costs of the air-cooled condensers in the field, little effort has been made to take full advantage of aluminum in tube and fin assemblies such as those that may be used in power plants and myriad other applications wherein aluminum fins are employed to achieve the higher thermal efficiencies that accompany the use of aluminum in heat exchangers due to its high thermal conductivity.

The present invention is directed to overcoming one or more of the above problems.

SUMMARY OF THE INVENTION

It is the principal object of the invention to provide a new and improved partition and fin assembly that may be used in heat exchangers, particularly in air-cooled condensers for power plants. It's also an object of the invention to provide a method of fabricating a fin and partition assembly. A further object of the invention is to provide a new and improved power plant of the steam driven type and including an improved air-cooled condenser.

According to one facet of the invention, there is provided a corrosion resistant heat exchanger assembly consisting essentially of a housing component having opposed sides and adapted to be contacted on a first side by a first heat exchange fluid and contacted on the other side by a second heat exchange fluid. A fin-like structure is brazed to one of the sides to enhance heat exchange between the heat exchange fluid on the associated side and the housing component. One of the housing component and the fin-like structure is formed of steel having an external aluminum coating facing the other of the housing component and the fin-like structure while the other of the housing component and the fin-like structure has an aluminum surface facing the aluminum coated steel component. Material of the composition of aluminum braze clad is located at the interface of the housing component and the fin-like structure and the assembly is characterized by the absence of any appreciable exposed layer of ferrous-aluminum intermetallic compound or intermediate phase on the one of the housing component and the fin-like structure in the area of the other of the housing component and fin-like structure.

To braze clad material may actually be clad on the component that is not aluminum coated steel, or may be made present at the interface of the partition and fin by any of a variety of means such as the use of a preform, the spraying of a slurry, etc.

As a consequence of the foregoing, and quite unexpectedly, even though the assembly has been exposed to temperatures sufficiently high to braze aluminum, there is a highly corrosion resistant layer of aluminum that is exposed to the ambient which may quickly oxidize to provide the usual protection against corrosion associated with an oxidized aluminum layer. Concerns about loss of the protective layer as by flaking or the like were the exposed protective layer to be ferrous-aluminum intermetallic compound or intermediate phase which typically is quite brittle, are avoided.

Also a strong fin-partition component bond, unexpected because of the known brittle nature of ferrous-aluminum reaction products, is obtained.

In a preferred embodiment of the invention, both the coating and the cladding include silicon.

The invention also contemplates a power plant that includes a steam turbine, a generator connected to the steam turbine to be driven thereby, and a condensate return line for providing condensed exhaust steam from the turbine for make up to a boiler for producing steam and an air-cooled heat exchanger operatively associated with the return line and made up of a plurality of the fin and housing component assemblies mentioned previously.

In a preferred embodiment of the invention, the housing components are elongated tubes and the assemblies are in side-by-side relation. In a highly preferred embodiment, the return line is in fluid communication with the turbine via the interior of the tubes of each fin and housing assembly.

In another embodiment of the invention, the line is in fluid communication with the turbine via a heat exchanger and means are provided for circulating a heat exchange fluid through the interior of the tubes and the heat exchanger.

The invention also contemplates the method of making a finned heat exchanger assembly which includes the steps of (a) providing a first heat exchanger component of the assembly which is formed of a ferrous material with a surface coated with aluminum; (b) providing a second heat exchanger component which has an aluminum surface; (c) abutting the surfaces together at an interface to form the assembly; (d) locating aluminum braze clad material at the interface; (e) raising the temperature of the assembly and the aluminum braze clad material to a level sufficient to at least partially melt the braze clad material; and (f) maintaining the temperature achieved during step (e) for a sufficient period of time to achieve a brazed joint between the first and second components.

In a highly preferred embodiment, the brazing temperature is maintained for a time that is insufficient to convert the coating and/or the cladding to a ferrous-aluminum intermetallic compound or intermediate phase.

Preferably, the ferrous material used is steel.

In highly preferred embodiment, the cladding and/or the coating includes silicon.

In a preferred embodiment, the second component is formed of aluminum.

In a highly preferred embodiment, the first component is a heat exchange partition and the second component is a fin.

In one embodiment, step (d) is performed by spraying braze clad material at the interface while in another embodiment of the invention, step (d) is performed by cladding the second component surface with the braze clad material prior to the performance of step (c), the step of assembling the surfaces together.

In one embodiment of the invention, a step of fluxing is performed before the fin and the tube are assembled together, and according to another embodiment of the invention, the fluxing is performed after the fin and tube are assembled together.

In a highly preferred embodiment, the tube is a flattened tube and the fin is a serpentine fin.

Preferably, the flattened tube has opposed, generally flat sides and there are two such fins with both of the fins being serpentine fins which are assembled to respective ones of the flat sides.

In an optimal embodiment of the invention, the brazing flux is made up of one or more potassium fluo-aluminate complexes and the brazing temperature is at least above the solidus of the braze cladding and below the melting point of the aluminum.

Even more preferably, the brazing temperature is at least about the liquidus of the braze cladding.

Other objects and advantages will become apparent from the following specification taken in connection with the accompanying drawings.

DESCRIPTION OF THE PREFERRED EMBODIMENTS

Figure 1:
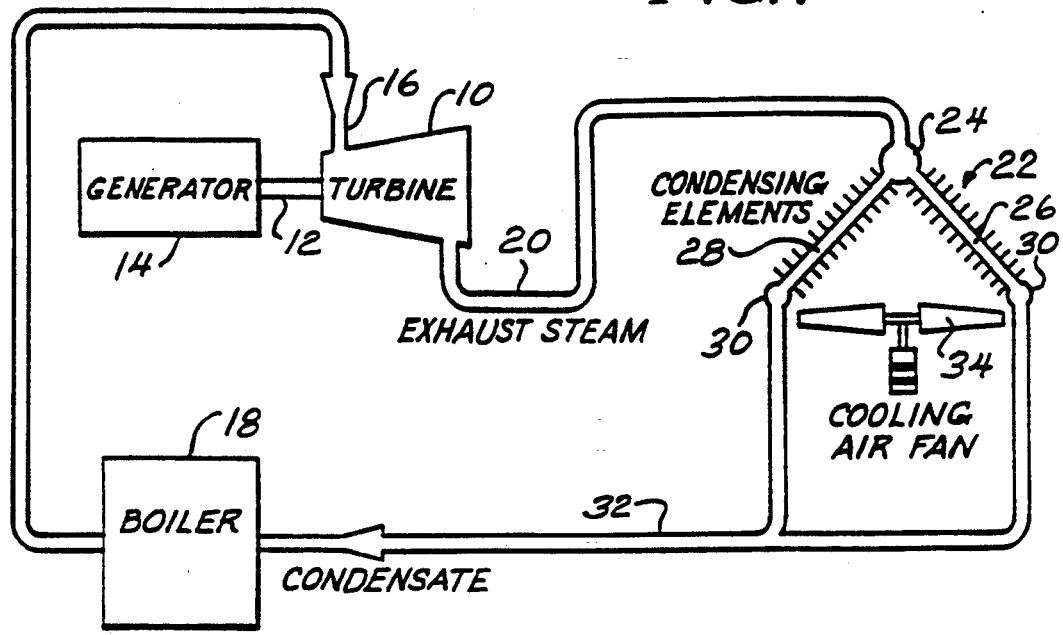
FIG. 1 is a schematic of a highly preferred embodiment of an electrical power plant embodying fin and tube assemblies made according to the invention.

This invention is applicable to various forms of heat exchangers and three different heat exchanger constructions are illustrated in the drawings and are described hereinafter. This description is intended to be exemplary and illustrative of the fact that the invention will find utility in heat exchanger constructions wherever the corrosion resistance and sacrificial cathodic action of aluminum may be advantageous. Thus, three different types of heat exchangers are illustrated more to show the versatility of the invention than to limit its use to any particular type of heat exchanger, including the three types illustrated.

Figure 2:
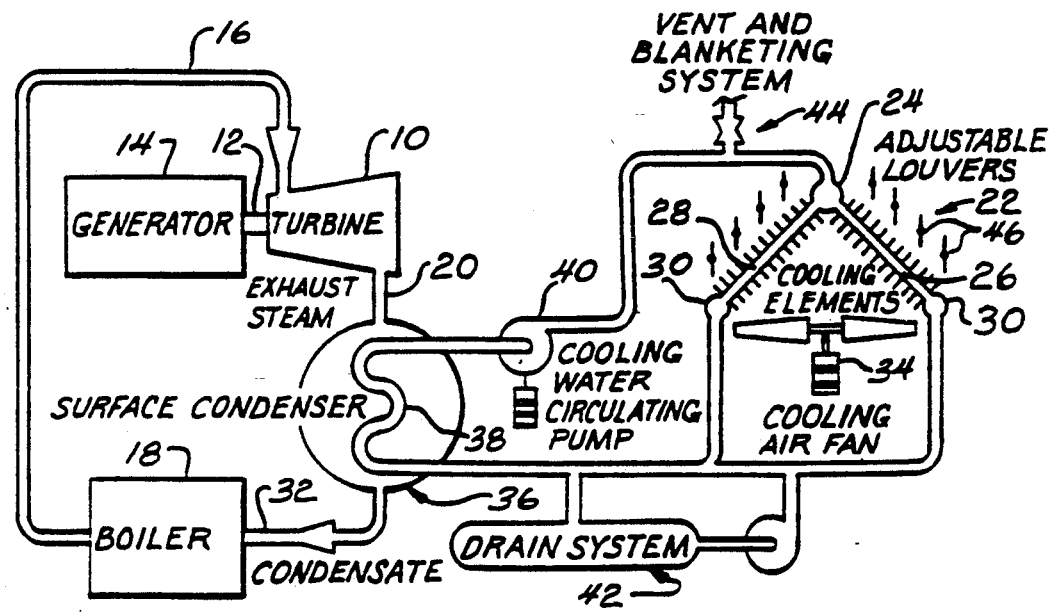
FIG. 2 is a schematic of an alternate form of power plant.

Exemplary embodiments of power plants that may utilize fin and tube assemblies made according to the invention are illustrated in FIGS. 1 and 2. FIG. 1 illustrates a so-called direct air-cooled condensing system, while FIG. 2 illustrates a so-called indirect air-cooled condensing system. Both are illustrated in simplified form, there being illustrated only those components that are required to achieve an understanding of the system.

Referring to FIG. 1, a steam turbine 10 includes an output shaft 12 connected to an electrical generator 14 for generating electrical power. The turbine 10 is driven by steam received in a line 16 extending from a boiler 18. Expanded or exhaust steam exits the turbine 10 through a line 20 and is then taken to a so-called A-tube condenser, generally designated 22. The unit 22 includes a common header 24 to which are connected right and left-hand legs 26 and 28 which in turn are made up of but a single row of tube and fin assemblies made according to the invention. Each of the legs terminates in a header 30 which are connected in parallel to a condensate return line 32 which feeds to the boiler 18. As is well known, one or more cooling air fans 34 is disposed between the legs 26 and 28 of the condensing unit 22 to drive air therethrough.

It will be readily appreciated that such a system is properly terms a direct air-cooled condensing system since the exhaust or spent steam from the turbine passes through the condensing unit 22 which is cooled by air before being collected in the condensate line 32 for return to the boiler 18 for re-evaporation.

Referring now to FIG. 2, like components are given like reference numerals and, in the interest of brevity, will not be redescribed. In this embodiment, the exhaust steam line 20 is connected to a surface condenser, generally designated 36, as is the condensate return line 32. The two are in fluid communication with each other as is well known and internally within the condenser 36 is a second heat exchange fluid flow path 38 which is connected to the headers 30 on the one hand, and to a pump 40 on the other. The pump 40 in turn is connected to the header 24. A drain system, generally designated 42, of conventional construction may be provided along with a vent and blanketing system, generally designated 44. Finally, adjustable louvers 46 are disposed on the sides of the legs 26 and 28 opposite the fan 34 so as to control air flow therethrough. In operation, exhaust system is cooled by heat exchange with cool water or other coolant circulated by the pump 40 through the heat exchange path 38 within the surface condenser 36.

Figure 4:
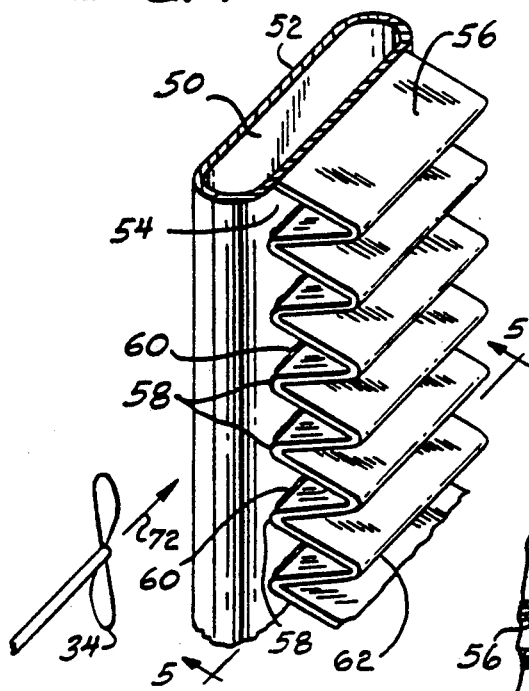
FIG. 4 is a fragmentary, prospective view of one of the fin and tube assemblies with only one fin assembled thereto.
Figure 3:
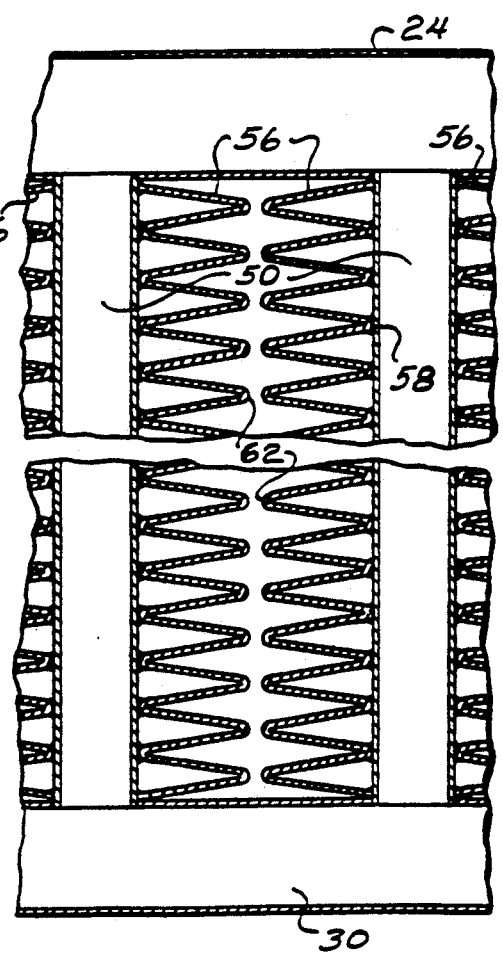
FIG. 3 is a fragmentary, sectional view of an air-cooled condenser or other form of heat exchanger embodying fin and tube assemblies made according to the invention.
Figure 5:
FIG. 5 is a sectional view of a louvered fin that may be utilized in the invention and taken approximately along the line 5—5 of FIG. 4.

FIGS. 3, 4 and 5 illustrate the structural detail of a representative one of the legs 26 or 28. Each leg includes a central flattened tube 50 having opposed flat sides 52 and 54 connected by rounds 55. Serpentine fins 56 are brazed to the tube 50, generally one serpentine fin 56 on each of the sides 52 and 54. That is to say, the crests 58 of each serpentine fine 56 are brought into contact with a corresponding one of the sides 52 or 54 and brazed thereto with braze fillets 60 being formed at the junction of the fins 56 with the corresponding side 52 or 54.

As can be seen in FIG. 3, the tubes 50 with the fins 56 brazed thereto are mounted in side-by-side, generally parallel relation with crests 62 that are opposite from the crests 58 which are brazed to the tubes 50 in close adjacency to one another. Typically, the space will be nominally on the order of 1/16 of an inch.

In some cases, the serpentine fins 56 will be louvered. That is to say, if one were to take a sectional view across one of the sections of each fin 56 between two adjacent crests 58 and 62, a series of louvers 68 opening in one direction would be located on one side of the fin and oppositely opening louvers 70 would be located on the other side of the fin. The louvers 68 and 70 may be conventionally fabricated along the entire length of each serpentine fin 56. Alternatively, the fins 56 may be non-louvered and flat or ruffled.

Generally speaking, the construction of each fin and tube assembly is along the line enclosed in the commonly assigned U.S. Pat. No. 4,256,177 issued to Zalman P. Saperstein on Mar. 17, 1981, the details of which are herein incorporated by reference. It is, however, to be noted that the intended direction of air flow through the assembly is generally parallel to the crests 58 and 62 as illustrated by the arrow 72 in FIG. 4. It is to be further noted that the fabrication of each tube 50 is accomplished in a somewhat different fashion as will be described in greater detail hereinafter.

In the usual case, the tubes 50 will be several feet long, frequently approaching 16 feet or longer. To provide the requisite strength, particularly when the same are partially filled with condensate and completely filled with liquid coolant, the tubes are formed of steel. According to a highly preferred embodiment, a round tubing having a 3 inch outer diameter and a wall thickness of 0.065 inches is flattened in a hydraulic press to the configuration illustrated in FIG. 4. Prior to flattening, the tube has been conventionally coated with an aluminum based coating. The aluminum coating preferably contains about 9% silicon, but otherwise is free of impurities within normal limits. In a highly preferred embodiment, the coating is applied at the will typically result in a coating thickness of 0.0005 inches.

Figure 6:
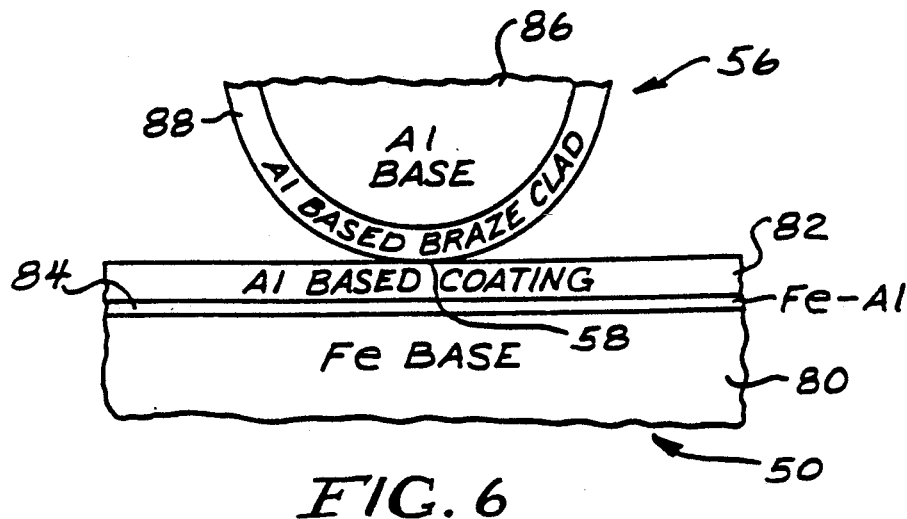
FIG. 6 is a somewhat schematic view of a potential joint between a fin and a tube prior to brazing.

With reference to FIG. 6, the steel base of which the tube is formed is illustrated at 80 and the aluminum based coating illustrated at 82. In the usual case, the process of coating the aluminum based coating 82 on the steel base 80 will result in a relatively thin layer 84 between the base 80 and coating 82 that is composed of ferrous-aluminum intermetallic compound or intermediate phase.

The fins 56 are made up of an aluminum base or core 86 which preferably is formed of 3003 aluminum. The base or core 86 is braze clad on both sides with an aluminum based braze clad layer 88 formed of 4343 braze cladding and thus will contain 6.8–8.2% silicon. Desirably, though not necessarily, both the braze cladding 88 and the core 86 will also include 1–1½% zinc.

Those skilled in the art will recognize the foregoing to be No. 12 brazing sheet according to "Aluminum Standards and Data" of the Aluminum Association, Inc. Other silicon contents may be used.

As an alternative to actually cladding the fins 56 with the brazed cladding 88, the same aluminum braze clad material or a like material may be placed at the interface of the aluminum fin and the tube 50 without cladding the same on either. For example, prior to assembly of the fin to the tube 50, or after the fin has been brought into contact with the tube 50, aluminum braze clad material may be placed at the interface of the tube 50 by spraying a slurry of the same thereon. Alternatively, a preform made of the braze clad material might be utilized.

Figure 8:
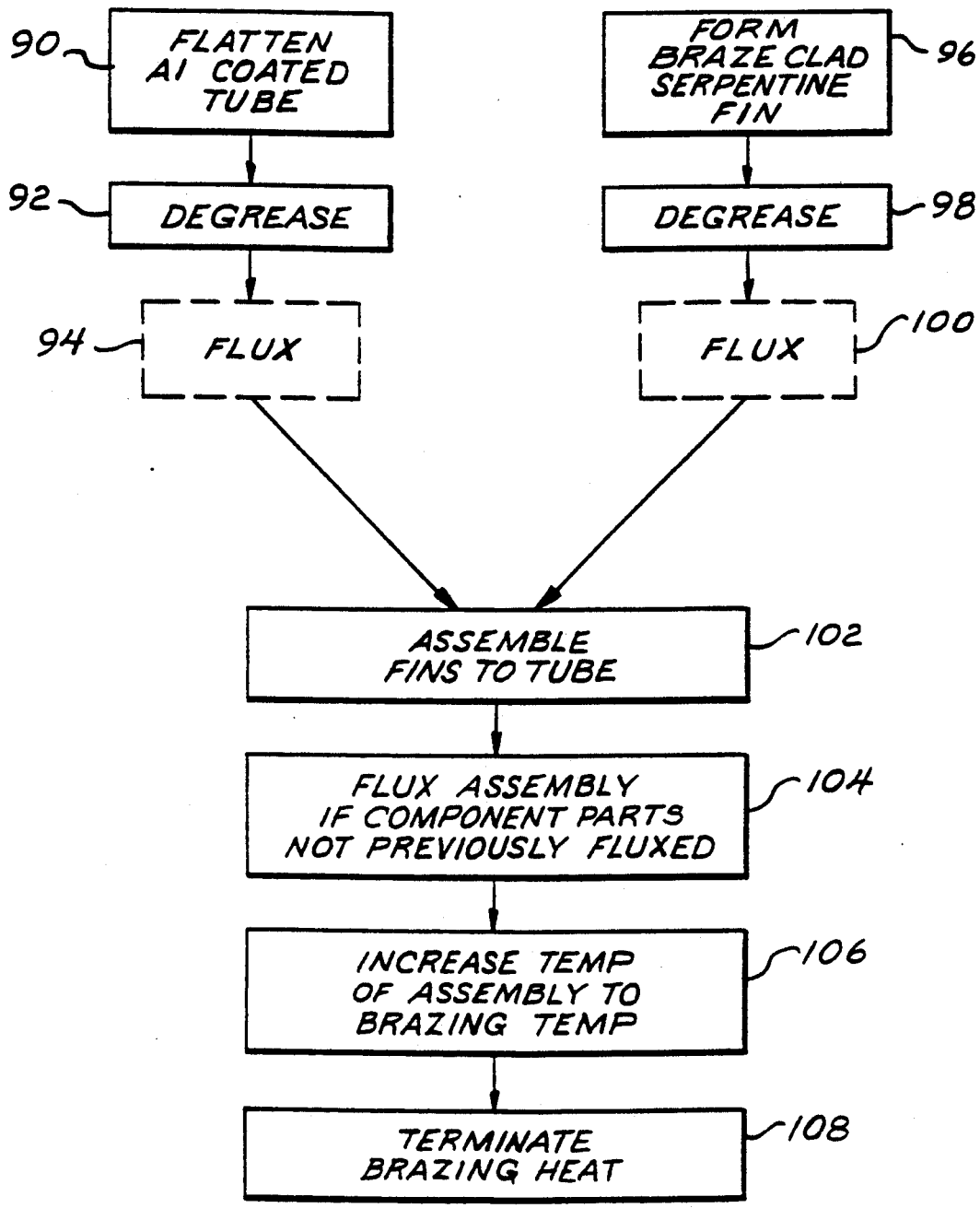
FIG. 8 is a flow diagram illustrating the steps of a method utilized to manufacture the fin and tube assembly.

Referring to FIG. 8, a first step in the method of manufacturing the fin and tube assembly is to flatten an aluminum-coated tube as previously described and as schematically illustrated at 90.

The resulting flattened tube is then subjected to a conventional degreasing operation shown at 92 and following that, may optionally be fluxed as shown at 94. According to a preferred embodiment, the flux employed is that sold under the trademark Nocolok and known as Nocolok 100 Flux. The Nocolok 100 Flux is a fine white powder which is composed of a near eutectic mixture of various potassium fluo-aluminate complexes. Preferably, the flux is applied by spraying the exterior of the tubes 50 with a mixture containing approximately 69% deionized water, 6% isopropanol and 25% Nocolok 100 Flux, although other mixtures may be used. Flux loading is at the rate of approximately 30-40 grams per square meter of external surface area.

The fins 56 are formed in a conventional fashion of the materials previously described as illustrated at the step shown in box 96. The resulting fin is then subjected to a conventional degreasing operation as shown by box 98 and then optionally fluxed as shown as 100 utilizing the same flux and application rate. However, if the fluxing is performed at the location in the method shown by the box 100, only one side of the fin has flux applied thereto to conserve flux.

Both the fluxed tube 50 and the fluxed fin 56 are then dried. For example, the same may be dried in a hot air oven at 285°-300° F. for approximately five minutes.

At this point, the fin 56 is assembled to the tube 50, and generally, a fin 56 applied to each of the sides 52 and 54 as indicated by the box 102. This may be done using suitable jigs or other fixtures so as to assure that the many crests 58 of each fin 56 are in abutment with the correspondingly flat side 52 or 54 as illustrated in FIG. 6.

Optionally, the assembly of the fins 56 to the tube 50 may immediately follow the degreasing steps shown at boxes 92 and 98. If such is done, the assembled tube and fins are subjected to fluxing as shown by a box 104. The same flux and same application rate are utilized. Needless to say, however, if flux is applied as illustrated at the boxes 94 and 100, the flux step 104 following assembly of the fins 56 to the tube 50 may be omitted.

The fluxed assembly of the tube 50 and fins 56 is then placed in a brazing oven and has its temperature increased to an appropriate brazing temperature as illustrated by the box 106. Preferably, the tube 50 is placed in the brazing oven with one of the fins 56 uppermost and the other fin 56 lowermost. At the brazing temperatures of concern, the aluminum fins 56 soften, though they do not melt so that the uppermost fin 56 sages. As a consequence, each of the crests 58 on the upper fin 56, if not already in contact with the tube 50, will sag into contact with the tube to be brazed thereto. At the same time, the weight of the tube 50 will depress the crests 58 of the lower fin 567 with which it is in contact which will settle to allow the tube 50 to descend until it is in contact with all of the crests 58 on the lower most fin 56. As a consequence, extremely long tube and fin assemblies may be fabricated without fear that several of the crests 58 will be not bond to the tube 50 leaving gaps in the tube-fin joint.

Of course, if the brazing oven performs vacuum brazing, magnesium will normally be provided to the system as is well known and all flux application steps may be omitted. Other brazing methods may also be used. The temperature of the assembly is increased to a temperature above the solidus of the aluminum based braze cladding 88 and below the melting point of the aluminum base or core 86. Preferably, the temperature of the assembly is raised to just above the liquidus of the aluminum based braze clad material 88 which will still be below the melting point of the aluminum core or base 86.

That temperature is maintained only for so long as is necessary to allow flow of the braze clad material sufficient to form the fillet 60. Generally, this will also cause the braze cladding material 88 to coat or flow or be distributed over the coating 82 on the exterior of the tube to provide a protective layer of the braze cladding on the tube.

Figure 7:
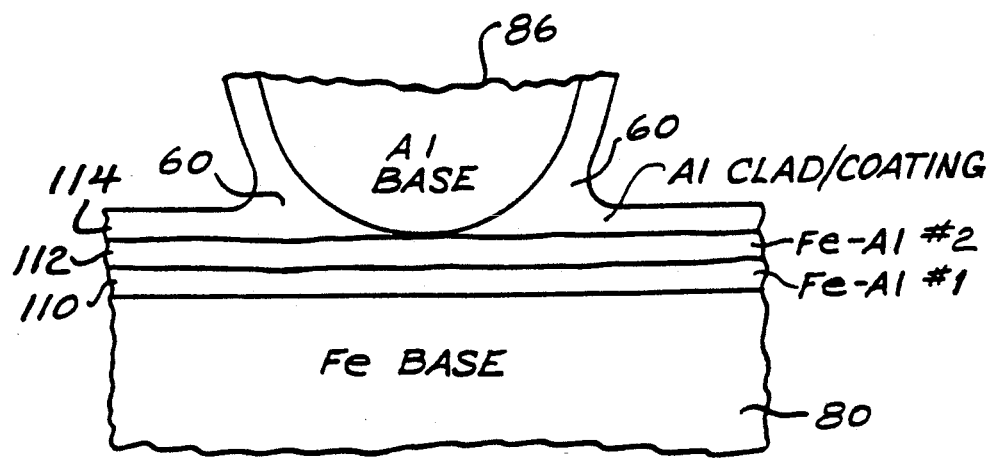
FIG. 7 is a view similar to FIG. 6 but illustrating the joint after brazing.

The application of brazing heat to the assembly is terminated as shown at box 108 as quickly as possible, given the foregoing criteria and before any appreciable ferrous-aluminum intermetallic compound or intermediate phase forms on the exterior of each of the tubes 50. The resulting joint will appear generally as illustrated in FIG. 7 wherein essentially only the steel base 80 and aluminum base 86 remain substantially unchanged from their prebrazing configuration.

More specifically, immediately adjacent the steel base 80 and in lieu of the relatively thin ferrous-aluminum intermetallic compound or intermediate phase layer 84 is a thicker, relatively iron rich first layer 110 of ferrous-aluminum intermetallic compound or intermediate phase. The layer 110 is in turn topped by a relatively aluminum rich second layer 112 of ferrous-aluminum intermetallic compound or intermediate phase. The first layer 110 is richer in steel than the second layer 112.

Finally, the second layer 112 will be topped by a layer 114 which is thought to be made up predominantly of the aluminum based braze clad, but may include some of the aluminum based coating originally placed on the tubes 50. The fillets 60 are formed of the material of the layer 114.

It is believed that the first layer 110 is much like the layer 84 and may amount to no more than a thickening of the layer 84 that occurs as temperature is elevated during the brazing process. The layer 112 is formed as a result of a reaction at the interface of the thickening layer 84, now becoming the layer 110 and the braze clad 88 and/or remaining part of the coating 82 once the solidus temperature of the braze clad is achieved. Steel in the second ferrous-aluminum intermetallic compound or intermediate phase layer 112 is provided thereto from the layer 84, as opposed to the base 80; and since the layer 84 has a lower concentration of steel than does the base 80, the lesser steel content of the layer 112 versus the layer 110 is possibly explained.

The corrosion resistance manifested by the resulting fin and tube assembly is quite unexpected. More particularly, the formation of ferrous-aluminum intermetallic compound or intermediate phase upon the heating of aluminum coated steel is known and it is likewise known that the intermetallic compound or intermediate phase is quite brittle. Thus, while the corrosion resistance of the intermetallic compound or intermediate phase may be satisfactory for many purposes, the brittleness of the same raises an expectation of a fragile layer which may readily flake away from the steel substrate to be protected, and exposing the substrate, allowing corrosion to take place and one which would not provide a strong bond with the fins.

Quite unexpectedly, by means of the present invention, even in the area between the crests 58, the aluminum layer 114 is formed over the layers 110 and 112 of intermetallic compound or intermediate phase to prevent flaking from occurring to provide the good corrosion resistance associated with aluminum once an oxide forms thereon and to provide a good fin-tube bond of unexpected strength.

In the area of the rounds 55, there may or may not be flow of braze material and/or aluminum coating during the brazing process, flow occurring in some instances and not in others. However, when there is no flow and intermetallic compound or intermediate phase surfaces at the rounds 55 as a result, the same has no detrimental effect. In particular, since the fins 56 are not attached to tube 50 at the rounds 55, there is no joint requiring strength that would be weakened by the presence of intermetallic compound or intermediate phase at that location. Consequently, the presence of intermetallic compound or intermediate phase at this location can be tolerated from the strength standpoint.

It is also significant that corrosion resistance will remain high in the event of intermetallic compound or intermediate phase forming on the surface of the rounds 55 since it has been found to exhibit high corrosion resistance. Also, since there are no fins 56 in the area of the rounds 55, there are no crevices along the joints of the fins 56 and the tube 60 that could hold and collect water or other corrosion causing liquid that would encourage corrosion, so the potential for corrosion is reduced.

Actual corrosion resistance as provided in the following tables illustrates actual test data comparing the corrosion resistance of: A) an aluminum coated steel including the layers 80, 82 and 84 that has not been heat t treated; B) an otherwise identical sample including the layers 80, 82 and 84 and which has been heated to temperatures and cycled as though being put through a conventional brazing cycle but without flux; C) a sample containing the layers 80, 110, 112 and 114, this sample being, of course, made according to the invention; and D) a sample identical to sample C) except containing 1-1½% zinc in the braze cladding. This sample D) is also made according to the invention.

The samples employed in Table No. 1 utilize aluminized steel tubing type I-25, wherein the aluminum coating contained approximately 9% silicon and was applied at the rate of about 0.25 ounces per square foot. All tube ends were welded shut and then epoxied. The samples were approximately 6 inches long. Two samples of each type were utilized, one internally pressurized, and the other not. The test results indicated no difference as between corrosion of pressurized versus unpressurized samples of the same type.

Table No. 1 illustrates the hours to the first sign of both red and white corrosion in a standard salt spray test, ASTM B117. Table No. 2 illustrates the same results for a so-called "cass" test, that is, a standard copper acidified salt solution test, ASTM B 368. The cass test illustrated that zinc in the braze cladding is a worthwhile addition.

TABLE NO. 1

| Sample No. | Hrs. To First Sign of Corrosion | |
|---|---|---|
| | Red | White |
| A3 | 792 | 144 |
| A4 | 792 | 144 |
| B3 | 120 | — |
| B4 | 120 | 168 |
| C3 | (No Red Rust after 3,312 hrs.) | 792 |
| C4 | (No Red Rust after 3,312 hrs.) | 792 |
| D3 | (No Red Rust after 3,312 hrs.) | 792 |
| D4 | (No Red Rust after 3,312 hrs.) | 792 |

TABLE NO. 2

| Sample No. | Hrs. To First Sign of Corrosion | |
|---|---|---|
| | Red | White |
| A1 | 120 | 24 |
| A2 | 120 | 24 |
| B1 | 24 | 120 |
| B2 | 24 | — |
| C1 | 192 | — |
| C2 | 192 | — |
| D1 | 840 | 216 |
| D2 | 840 | 216 |

In the exemplary embodiment described, utilizing a continuous, nitrogen purged brazing furnace, the desired brazing and termination of the application of heat may be achieved by operation as follows.

The assembled fin and tube are first passed through relatively low temperature zones for drying purposes. Three zones are utilized and a residence time of 3 to 4½ minutes in each zone may be employed. The zones have progressively increasingly temperatures of 200° F., 250° F., and 300° F. Thereafter, the assembled tube and fins are subjected to preheat in five zones whose temperatures progress from 650° F. to 840° F. to 955° F. to 1015° F. to 1000° F. Residence times in each zone are in the range of 2.0 minutes to 3.2 minutes.

Brazing takes place in five zones whose temperatures are respectively, from start to finish, 1100° F., 1120° F., 1130° F., 1130° F. and 1115° F. The residence times in the corresponding zones are in the range as follows: 5⅝–8½ minutes; 3¼–45/6 minutes; 2¾–4.2 minutes; 2¾–4.2 minutes; and 2¼ minutes to 3.8 minutes.

A nitrogen flow of 3200 cubic feet per hour is employed such that the furnace dew point is minus 40° F. and oxygen content is less than 10 parts per million.

Alternatively, a batch brazing procedure can be performed in a programmed vacuum brazing furnace such as an Ipsen vacuum furnace. An initial rough vacuum down to 40 microns of pressure is first drawn. Thereafter, for a high vacuum cycle the customary diffusion pump is maintained open for two minutes to achieve a pressure of approximately $3 \times 10^{-4}$ torrs (a vacuum pressure of 1 torr is equivalent to 100 microns). During the high vacuum cycle, temperature within the furnace is increased at the rate of 50° Fahrenheit per minute until the temperature reaches 100° F. When this occurs, the diffusion pump is closed and the high vacuum cycle ended.

Immediately thereafter, the furnace is backfilled with nitrogen to one atmosphere of pressure. When backfilling is completed, a constant flow of nitrogen at approximately 9.5 cubic feet per minute is maintained. During this time, the temperature within the furnace is increased at the rate of 100° F. per minute until a temperature of approximately 970° F. is reached. Approximately 8.7 minutes is required during this segment of temperature increase.

The temperature is increased from 970° F. to 1100° F. at the rate of 50° F. per minute. At 1100° F., a five minute soak is performed and generally, this will have the effect of raising the temperature of the tube and fin assembly to be brazed to approximately 980° F.

Lastly, temperature is raised from 1100° F. to a maximum temperature of 1170° F. at a rate of 25° F. per minute. When 1170° F. is reached, a final soak period of approximately eight minutes is required to raise the temperature of the tube and fin assembly to approximately 1125° F. At that point, a conventional nitrogen gas cooling cycle is initiated.

The dew point within the oven is about −40° F. during this cycling.

The unexpected corrosion resistance achieved by the process is, of course, evident from the data contained in Table No. 1. Other tests have shown that with the process, the corrosion resistance provided with tubing provided with an aluminum coating at the rate of 0.25 ounces per square foot has corrosion resistance which is equal to or greater than otherwise identical tubes coated at the rate of 0.40 or even 0.60 ounces per square foot.

It is believed that the strong bonds and corrosion resistance in part results from a coating of substantially that part of the entire structure in the vicinity of the fins that results from the braze clad flowing from the fins on to the exterior surface of the tube. It is also believed that cathodic protection for the steel is provided by the use of an uncoated aluminum fin.

In connection with the former, since only one side of a fin is bonded to a tube, it is possible to utilize braze clad only on that one side, that is, use No. 11 brazing sheet if desired. However, this will reduce the quantity of braze clad available to flow from the fin to the tube; and in this connection, it is believed that when louvered fins are employed, the presence of the louvers enhances the flow of braze clad toward the tube from the side of the fin opposite the tube. That is to say, it is believed that braze clad from the side of the fin opposite the tube flows to the tube side of the fin and then to the tube through the louvers.

It is expected that use of a tube and fin assembly made according to the invention will shown a 30% increase in heat rejection when used as a steam condenser over the all-steel, galvanized plate fin and tube construction or tubes provided with wound aluminum fins. As a consequence, condensers utilizing tube to fin and tube assemblies made according to the invention may be made with a single row of tubes rather than two or more rows to reduce field erection costs. Furthermore, the use of a single row of fins will reduce air side pressure drop, thereby lowering energy costs per operation of the fans such as the fan 34.

While the invention has thus far been described in terms of flattened tubes and serpentine fins, it should be understood that round or other shaped tubes and plate or wound fins may also be used and achieve the surprising corrosion resistance and unexpectedly strong steel to aluminum brazed bonds of the invention.

Figure 9:
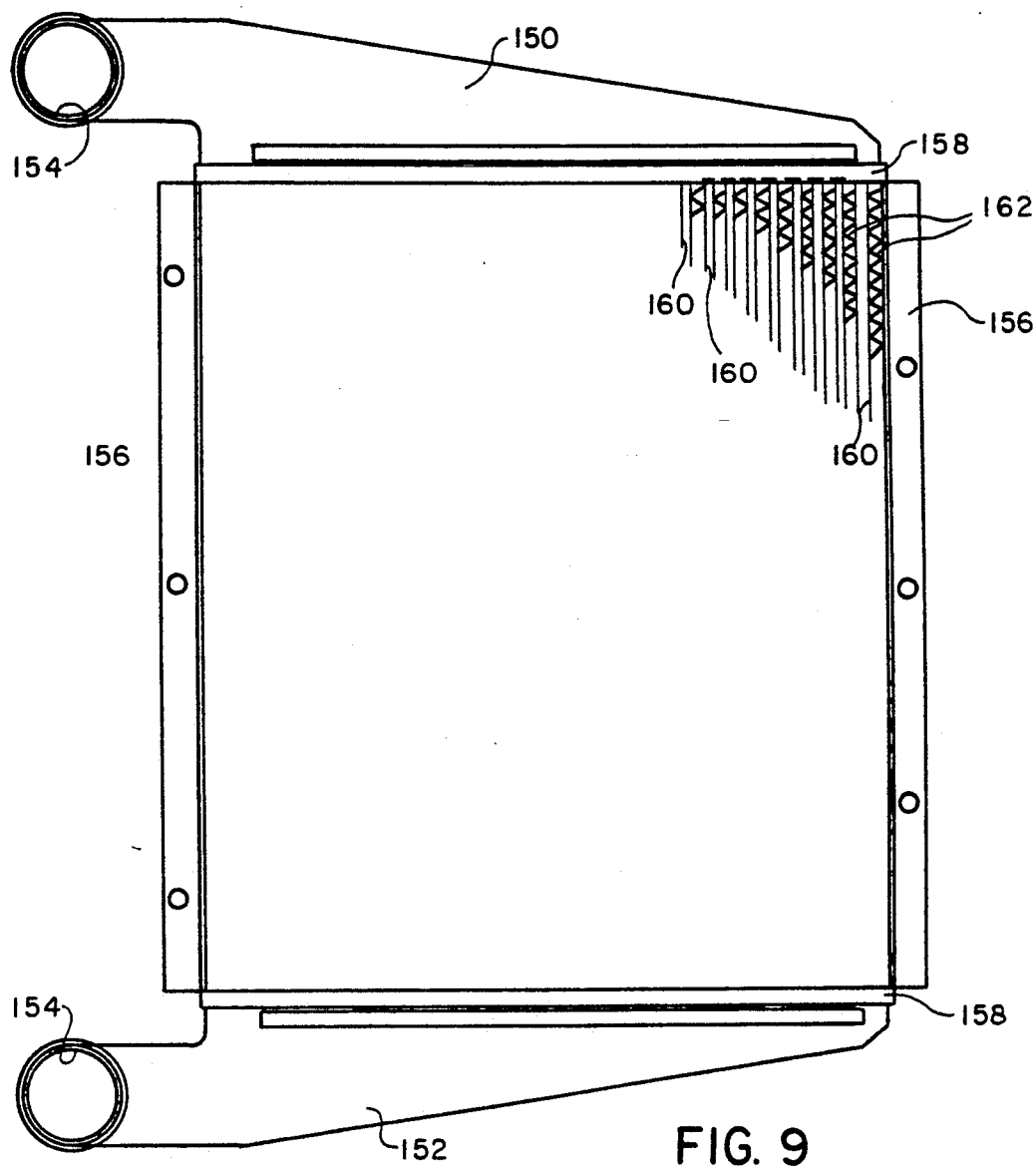
FIG. 9 is an elevation of another type of heat exchanger that may be fabricated according to the invention.
Figure 10:
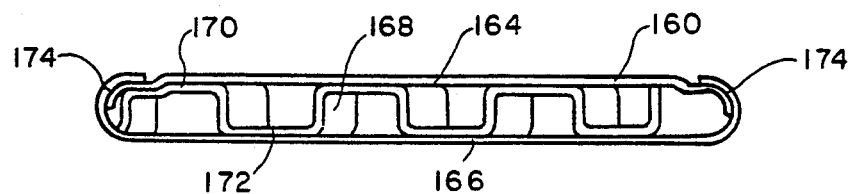
FIG. 10 is an enlarged, sectional view of a tube used in the embodiment illustrated in FIG. 9 which is provided with an internal fin.

By way of example, a so-called charge air cooler or intercooler such as illustrated in FIGS. 9 and 10 may be fabricated according to the invention. Such charge air cooler are typically interposed between a turbocharger and the intake manifold of an internal combustion engine. The construction shown in FIGS. 9 and 10 is described in greater detail in U.S. Pat. No. 4,805,693 issued Feb. 21, 1989 to Flessate and assigned to the same assignee as the instant application, the details of which are herein incorporated by reference.

For illustrative purposes, it is noted that the charge air cooler includes upper and lower manifold tanks 150 and 152, respectively. Each is provided with an opening 154 for the ingress or egress of a heat exchange fluid, namely, in this case, hot air from a turbocharger. Side frame members 156 interconnect header plates 158 associated with the manifolds 150 and 152 and elongated, flattened tubes 160 extend between the header plates 158 to establish fluid communication between the manifolds 150 and 152. Serpentine fins 162 are located between adjacent tubes 160 as well as between the endmost tubes 160 and the side plates 156. FIG. 10 shows the cross section of one of the tubes 160 and the same is seen to include opposed, flat sides or walls 164 and 166. An undulating internal fin 168 has opposed flattened crests 170 and 172, which are in contact with the interior sides of the opposed walls 164 and 166, respectively. Clinches 174 secure the components forming the tube 160 together.

The internal fin 168 acts as a turbulator and enhances heat transfer from or to the heat exchange fluid flowing within the tube 60 of the tube walls 164 and 166 and thus, to the serpentine fins 162 that are bonded to the exterior surfaces thereof.

The fin 168 may be bonded to the interior surfaces of the walls 164 and 166 in the same manner previously described. That is to say, the fin 168 may be made of aluminum and the tube 160 of aluminum coated ferrous material. Alternatively, or additionally, the fins 162 may be bonded to the tubes 160 in the manner described previously, in which case the fins 162 will likewise be made of aluminum.

In some instances, it may be desirable to form the tube 160 of aluminum and the fins 162 and/or 168 of aluminum coated steel.

Figure 11:
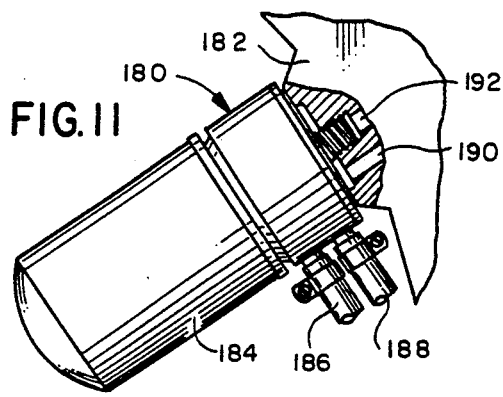
FIG. 11 is a elevation of still another form of heat exchanger, specifically, an oil cooler, that may be made according to the invention and illustrated in its environment of intended use and with parts thereof broken away for clarity.
Figure 12:
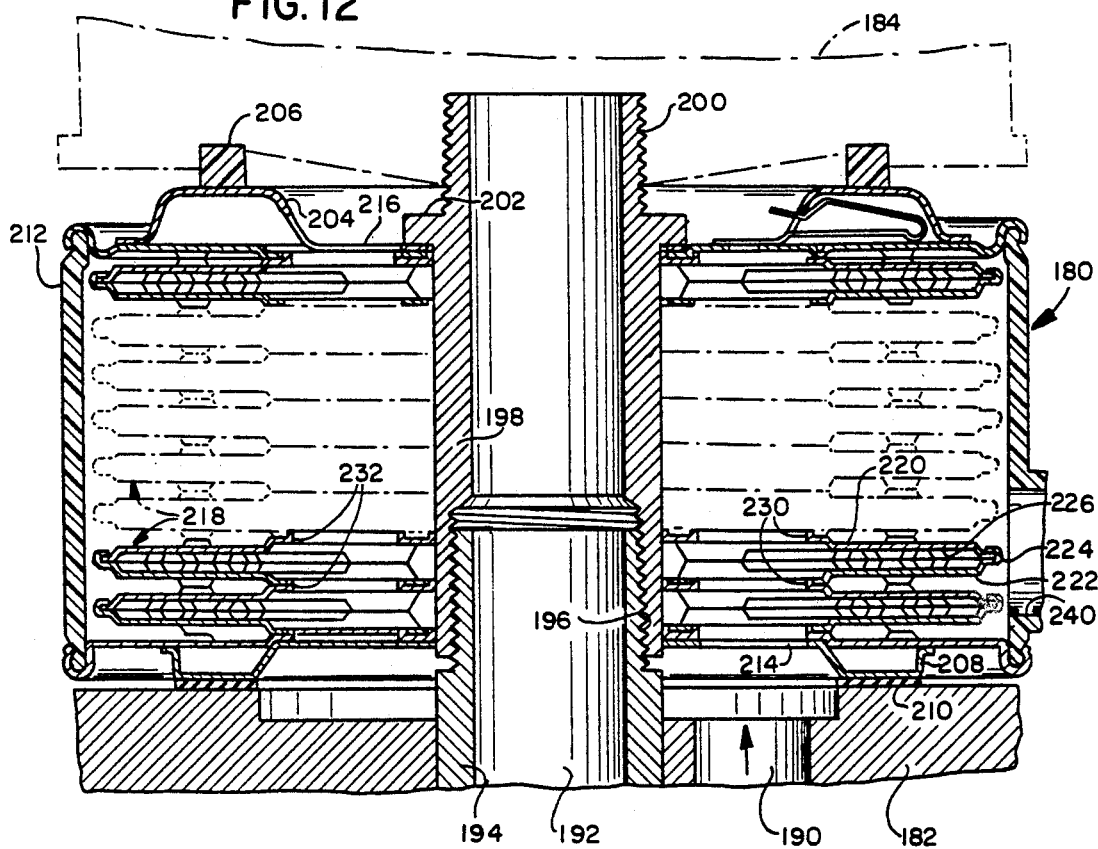
FIG. 12 is an enlarged, sectional view of the heat exchanger of FIG. 11.
Figure 13:
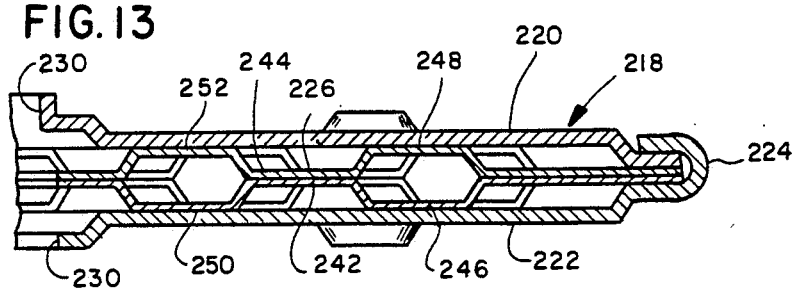
FIG. 13 is a fragmentary, sectional view of a part of the heat exchanger shown in FIGS. 11 and 12 illustrating a housing component or partition assembly, including an internal fin.

Still another type of heat exchanger which may be fabricated according to the invention is illustrated in FIGS. 11–13, inclusive. These figures illustrate a so-called "donut" oil cooler of the type more fully disclosed and claimed in U.S. Pat. No. 4,561,494 issued Dec. 31, 1985 to Frost and assigned to the same assignee as the present application, the details of which are herein incorporated by reference. The oil cooler is generally designated 180 and is affixed to the block 182 of an internal combustion engine. A conventional oil filter 184 is in turn secured to the oil cooler 180. Lines 186 and 188 extend to the oil cooler 180 and interconnect the same into the cooling system for the engine whose lubricating oil to be cooled. Oil is directed to the oil cooler 180 via a passage 190 in the block 182 and return lubricating oil is received by the engine via a passage 192.

As seen in FIG. 12, the passage 192 is defined by a sleeve 194 terminating in a threaded end 196 which in turn receives an extender 198. The extender 198 includes a threaded end 200 which is received by the oil filter 184. The extender 198 also includes an exterior collar 202 which bears against a generally conventional dome plates 204 to sealably lock the oil cooler 180 to the engine block 10. A gasket 206 is disposed between the dome plate 204 and the filter 184.

The end of the oil cooler 180 opposite the dome plate 204 includes a conventional gasket plate 208 mounting a gasket 210 that sealingly engages the engine block 182.

A housing 212 interconnects the dome plate 204 and the gasket plate 208 and the latter is provided with an opening 214 which serves as an inlet for oil from the passage 190. Diametrically oppositely of the opening 214, the dome plate 204 includes an opening 216 to establish fluid communication to the filter 184.

A stack of individual heat exchange units, generally designated 218, is located within the housing thus defined. Each heat exchange unit is made up of two spaced plates 220 and 222 which are clenched at their outer periphery as shown at 224. A turbulating fin 226 is disposed in the space between each of the plates 220 and 222 and is bonded to both. The plates 222 and 224 include sealed openings 230 aligned with the opening 214 so that oil may be flowed to the space between each of the plates 220 and 222 making up a heat exchange unit 218 to flow through the turbulator fin 226 about the extender 198 to aligned, sealed openings 232 in the plates 220 and 222 and diametrically opposite of the openings 230. The openings 232 establish a channel to the opening 216 in the dome plate 204.

In the usual case, engine coolant will be utilized to cool the oil passing in the path just mentioned and such coolant may enter a port 240 to the interior of the housing to flow about the exterior of each heat exchange unit 218 and leave via a similar port connected to the line 188.

As illustrated in FIG. 13, the turbulator fin 226 is made up of abutting plates 242 and 244 which have been stamped to provide strands 246 and 248 displaced from the plane of the plates 242 and 244 respectively. Each of the strands 246 and 248 include a plurality of crests 250 and 252, respectively, that are in contact with and bonded to the abutting side of one the plates 220 or 222. The strands may be in staggered rows.

The plates 220 and 222 thus serve as partition to isolate oil which flows within each of the heat exchange units 218 from the coolant which flows exteriorly of each unit 218, but within the housing 212 of the oil cooler 180. The turbulator fins 226 serve to conduct heat from the oil to the plates 220 and 222. To this end, the turbulator fins 226 are brazed to the plates 220 and 222 of each heat exchange unit 218.

This brazing operation may be performed utilizing materials and other conditions as previously described. In the usual case, the plates 242 and 244 making up the turbulator fin 226 will be braze clad aluminum, while the plates 220 and 222 will be ferrous material coated with aluminum.

From the foregoing, it will be appreciated that heat exchange assemblies made according to the invention may be of vastly varying types and useful in many differing environments where corrosion resistance is required along with high transfer and durability.

We claim:

1. A method comprising:
   a) providing a body of ferrous material having at least one surface coated with aluminum;
   b) placing the body in a furnace;
   c) raising the temperature of the body in the furnace until the melting temperature of the aluminum is approached;
   d) maintaining the raised temperatures for a predetermined period of time; and
   e) providing a nitrogen atmosphere in the furnace during the performance of step d).

2. The method of claim 1 wherein said raised temperature is in the range of about 980°–1125° F.

3. The method of claim 1 wherein step 3) is performed by purging the furnace with nitrogen.

4. The method of claim 3 wherein the purging is such as to reduce oxygen content in the furnace to less than 10 ppm.

5. The method of claim 1 wherein step 3) is performed such as to reduce oxygen content in the furnace to less than 10 ppm.

6. The method of claim 1 wherein step 3) is performed by backfilling the furnace with nitrogen.

* * * * *

UNITED STATES PATENT AND TRADEMARK OFFICE
CERTIFICATE OF CORRECTION

PATENT NO. : 5,277,358

DATED : January 11, 1994

INVENTOR(S) : Andrew J. Cottone and Zalman P. Saperstein

It is certified that error appears in the above-identified patent and that said Letters Patent is hereby corrected as shown below:

Col. 14, line 34, delete "3)" and insert therefor --e)--;
       line 39, delete "3)" and insert therefor --e)--; and
       line 42, delete "3)" and insert therefor --e)--.

Signed and Sealed this

Twentieth Day of February, 1996

Attest:

BRUCE LEHMAN

*Attesting Officer*     Commissioner of Patents and Trademarks

(12) EX PARTE REEXAMINATION CERTIFICATE (8395th)
United States Patent
Cottone et al.

(10) Number: US 5,277,358 C1
(45) Certificate Issued: Jul. 12, 2011

(54) FINNED ASSEMBLY FOR HEAT EXCHANGERS

(75) Inventors: Andrew J. Cottone, Racine, WI (US); Zalman P. Saperstein, Lake Bluff, IL (US)

(73) Assignee: Modine Manufacturing Company, Racine, WI (US)

Reexamination Request:
No. 90/009,304, Nov. 24, 2008

Reexamination Certificate for:
Patent No.: 5,277,358
Issued: Jan. 11, 1994
Appl. No.: 08/038,926
Filed: Mar. 29, 1993

Certificate of Correction issued Feb. 20, 1996.

Related U.S. Application Data

(60) Division of application No. 07/855,248, filed on Mar. 23, 1992, now Pat. No. 5,305,945, which is a continuation of application No. 07/697,204, filed on May 8, 1991, now Pat. No. 5,102,032, which is a division of application No. 07/558,613, filed on Jul. 26, 1990, now Pat. No. 5,042,574, which is a continuation-in-part of application No. 07/406,064, filed on Sep. 12, 1989, now Pat. No. 4,949,543.

(51) Int. Cl.
*B23K 1/00* (2006.01)
*B23K 35/00* (2006.01)
*F28F 1/12* (2006.01)
*F28F 19/06* (2006.01)
*F28F 13/12* (2006.01)
*F28F 19/00* (2006.01)
*F28F 13/00* (2006.01)
*F28D 1/04* (2006.01)
*F28D 1/053* (2006.01)

(52) U.S. Cl. .................. 228/219; 148/531; 228/262.43; 228/262.5

(58) Field of Classification Search ........................ None
See application file for complete search history.

(56) References Cited

U.S. PATENT DOCUMENTS

| 3,134,685 A | 5/1964 | Dravnieks |
| 3,553,825 A | 1/1971 | Dockus et al. |
| 5,305,945 A | 4/1994 | Cottone et al. |

*Primary Examiner* — Krisanne Jastrzab

(57) ABSTRACT

Potential difficulties with corrosion in heat exchangers utilizing aluminum fins are avoided by using fin and tube constructions made by a method which includes the steps of providing a flattened tube (50) of ferrous material (80) and having an exterior coating (82) predominantly of aluminum; providing at least one serpentine fin (56) of aluminum (86) and clad with a predominantly aluminum braze cladding (88); assembling (102) the fin (56) to the flattened tube (50); applying (94), (100), (104), a brazing flux to at least one of the fin (56) and the tube (50); raising (106) the temperature of the assembly to a level sufficient to at least partially melt the braze cladding (88); and maintaining the temperature for a sufficient period of time to achieve a brazed joint (60) between the fin (56) and the tube (50) but a time insufficient to convert the coating (82) and the cladding (88) to ferrous-aluminum intermetallic compound or intermediate phase.

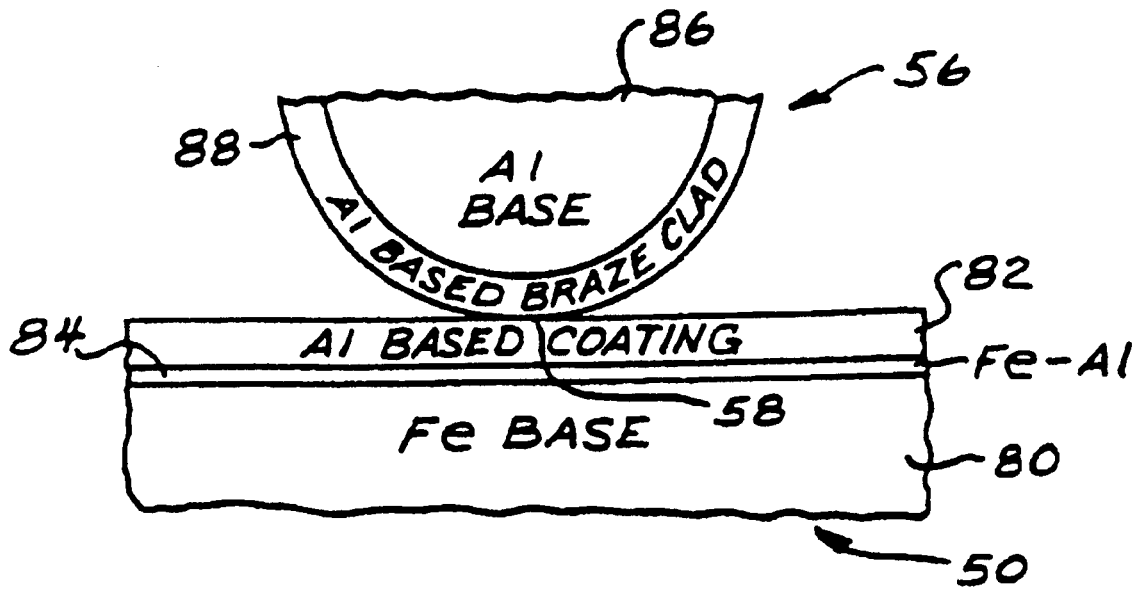

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 are cancelled.

* * * * *